(12) United States Patent
Busby et al.

(10) Patent No.: US 6,509,935 B1
(45) Date of Patent: Jan. 21, 2003

(54) METHOD FOR IMPROVED CHROMA-KEY SUPPRESSION

(75) Inventors: Bruce E. Busby, Los Altos, CA (US); Robert A. Williams, Los Altos, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/033,663

(22) Filed: Mar. 3, 1998

(51) Int. Cl.[7] ................................................ H04N 9/75
(52) U.S. Cl. ........................................ 348/592; 348/587
(58) Field of Search .................................. 348/585, 586, 348/587, 590, 591, 592; H04N 9/74, 9/75

(56) References Cited

U.S. PATENT DOCUMENTS

| | | | |
|---|---|---|---|
| 5,347,622 A | 9/1994 | Takemoto et al. | 395/135 |
| 5,448,307 A | 9/1995 | Gelissen et al. | 348/584 |
| 5,903,275 A | 5/1999 | Guay | 345/430 |
| 5,990,903 A | 11/1999 | Donovan | 345/432 |
| 5,999,189 A | 12/1999 | Kajiya et al. | 345/430 |
| 6,038,031 A | 3/2000 | Murphy | 358/1.09 |

*Primary Examiner*—Sherrie Hsia
(74) *Attorney, Agent, or Firm*—Woodcock Washburn LLP (57) ABSTRACT

A method provides for an improved chroma-key suppression technique. The improved method reduces a halo-like effect which might otherwise appear in a composite image containing a foreground object selected from a first image and a background image selected from a second image. In accordance with the present invention, a chroma-key patch is translated into x, y axis coordinates and one or more pixels of the image in question can be compared to a chroma-key patch and a transition region at least partially surrounding the chroma-key patch to better select suppression signals to be applied in an image processing operation.

22 Claims, 6 Drawing Sheets

Prior Art

METHOD FOR IMPROVED CHROMA-KEY SUPPRESSION

BACKGROUND OF THE INVENTION

The present invention is directed to a method for improved chroma-key suppression. Specifically, the present invention is directed to a method for improving the suppression of a halo effect which might otherwise occur in chroma-key processing of images.

It is common in the art of image processing to desire to take two separate images and somehow combine parts of those images to create a third, new image. One common way of creating such a composite image is to take a first image which will constitute a foreground image, and discriminate out those objects which one desires to superimpose upon a background image.

Figure 1A:
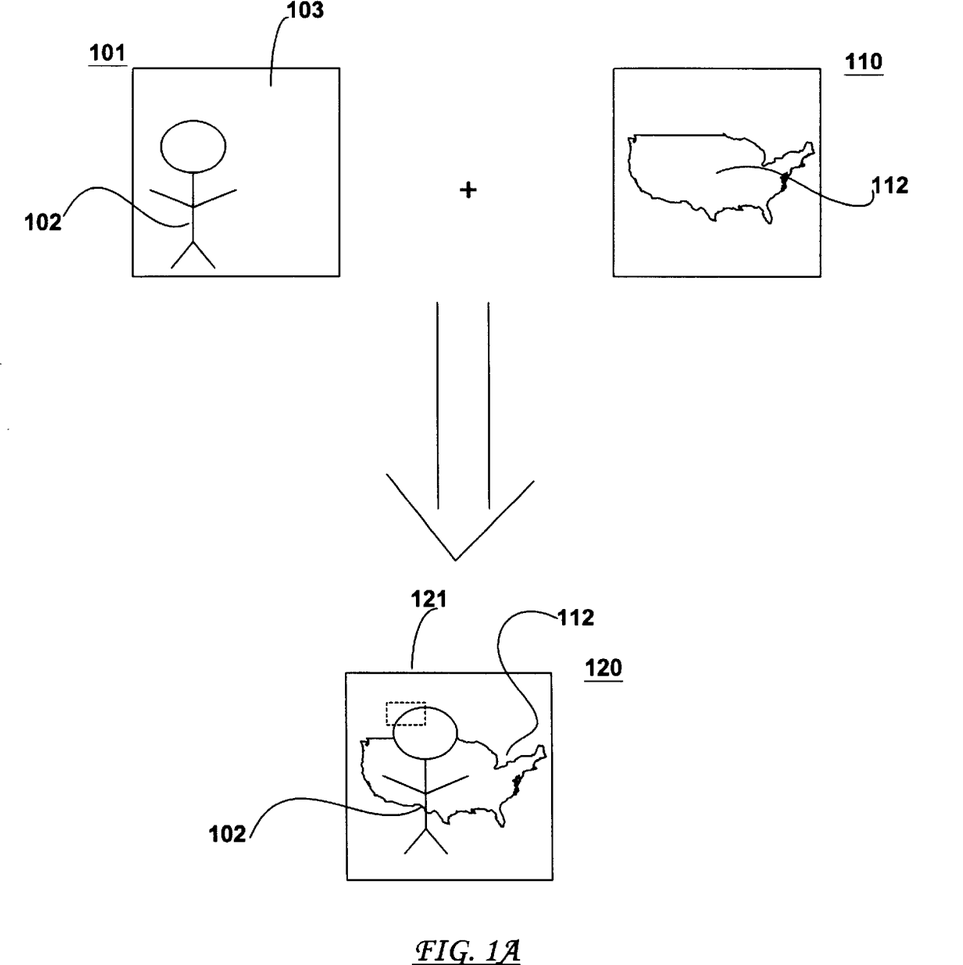
FIGS. 1A and 1B are sample images shown for purposes of explaining an environment in which the present invention can be employed.

An example of such an operation of creating a composite image will now be described with respect to FIGS. 1A. and 1B. In particular, two images, 101 and 110 are shown in FIG. 1A. It is the goal of the user of an image processing system to create a composite image such as that shown as image 120 in FIG. 1A. For example, a first image 101 can be constituted by an image of an individual standing in front of a single color background. It might be desirable to superimpose the image of the individual over a selection of other images. One such image might be a map of the Untied States roughly shown as element 112 in second image 110. This would commonly be done, for instance, in the reporting of weather information where a weather forecaster's image is superimposed upon a picture of a map or other information related to the weather forecast. In such examples, the background of the first image is typically a single color such as blue or green. The goal is to create a composite picture such as that shown in 120 where the person 102 is projected or superimposed over the map 112.

In a process that will be described with respect to FIGS. 2A and 2B, in essence, the picture of the individual in the first image is cut out or discriminated from the first image that might be considered a foreground image. That cut out component of the foreground image is then added to the second image or background image. In fact, the second image can be processed to cut out a portion into which the foreground object will be inserted.

Figure 2A:
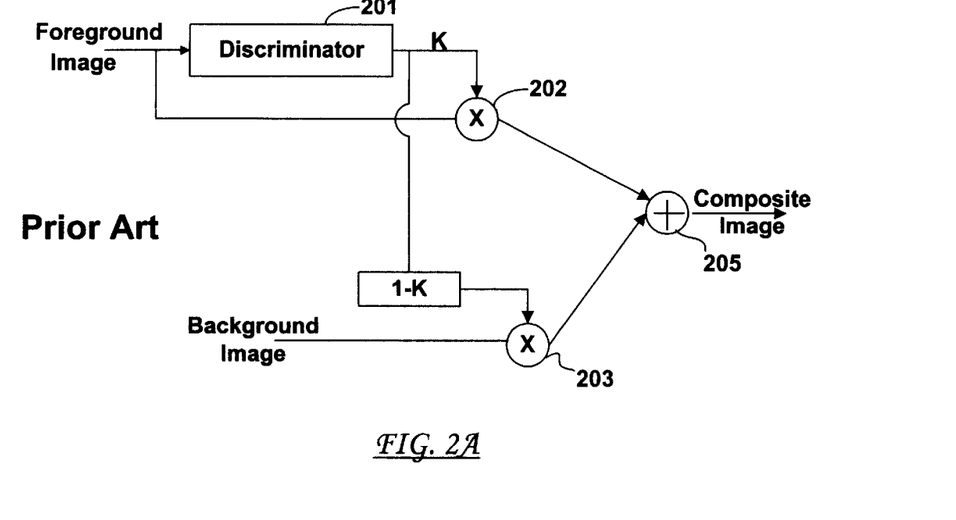
FIGS. 2A and 2B illustrate, in block diagram form, examples of prior art image processing configurations.

One known technique for creating such a composite image is shown in FIG. 2A. This technique involves processing image information in the digital domain. Therefore, keeping with weather map scenario described above, television signal representations are digitized to create a pixel stream associated with each image frame. A pixel representation of the foreground image is first supplied to a discriminator 201. The discriminator analyzes the pixels of the foreground image and detects those that correspond to the background color, that is the color of background 103. A chroma-key signal "K" is produced based on the detection of those pixels which correspond to the background color. Typically, this key signal could constitute a stream of 0s and 1s, where 0s indicate that the pixel should be removed because it matches the background color which should be deleted from the image so as to leave only the foreground object. The 1s could correspond to those pixels which do not correspond to the background color and therefore are presumed to be part of the foreground object which is to be supplied in the composite image. The foreground image and the chroma-key signal K are supplied to a multiplier 202 whereby the multiplier output is the discriminated foreground object alone without the background. Furthermore, the chroma-key signal K is used to create a multiplier to be applied to the background image multiplier 203. The result is that the space into which the foreground object is to be inserted is removed from the background image. Thus, the cut-out foreground object and the background image minus the area into which the foreground object is to be inserted are added together by adder 205 to create the composite image. This "hard" discrimination can result in an abrupt transition that constitutes visibily disturbing aliasing.

Figure 1B:
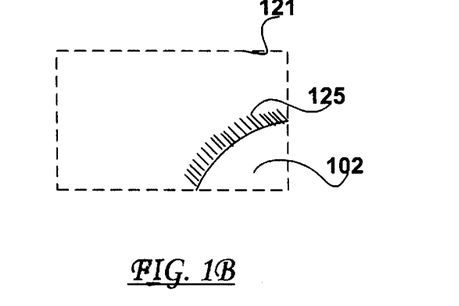

It is known in the art to try to perform a softer discrimination than that described above, whereby the processing creates a soft transition from the foreground to the background image. However, one of the drawbacks of known techniques for soft discrimination is that a halo effect is created around the boundary of the foreground object. An example of this is shown in connection with FIGS. 1A and 1B. More particularly, in the dashed box area shown as 121 in FIG. 1A and enlarged in FIG. 1B, one portion of the boundary of the foreground object shown as 125, here the head of the individual, may be subjected to a halo effect because of the fact that the pixels that form the boundary region may have been somewhat close in color to the background 103 but did not correspond to the background color sufficiently to be subjected to the keying operation. That is, those pixels may not have been designated as "0" areas that matched the background color which was to be deleted. Therefore, that color which is not truly a part of the object of interest is not deleted from the foreground image in the discriminating operation and carries over into the composite image thereby creating a halo-like effect around the foreground object.

One technique for dealing with this halo-like effect is to modify the first image so as to attempt to force all of the pixels surrounding the foreground object to the same color, thereby changing the pixels in the boundary region to make them more closely correspond to the color of the key patch.

Figure 2B:
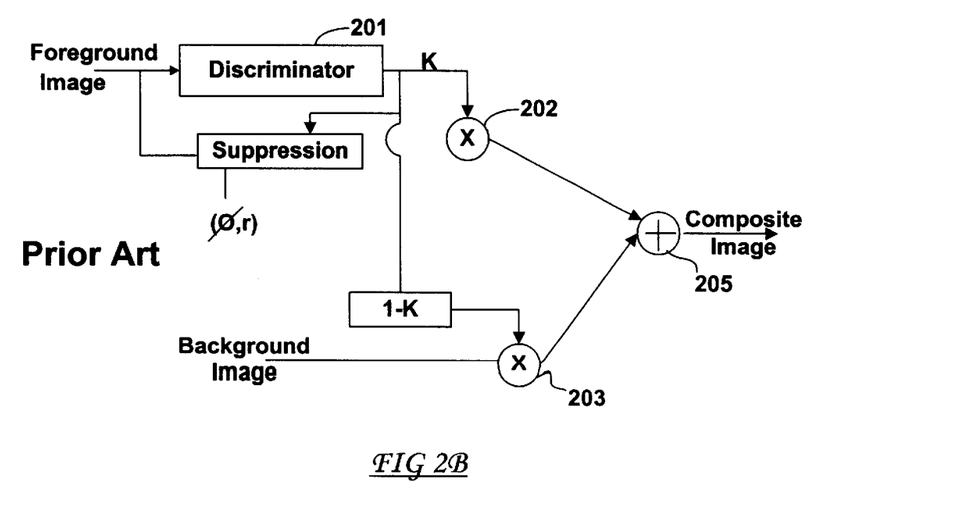

Another technique is shown in FIG. 2B where a suppression operation is supplied to the foreground image before it is multiplied by the key signal K. However, this suppression operation does not typically deal with the extent to which the color or colors around the boundary of the foreground object and the background of the foreground image vary around the boundary of the object and how closely they correspond to the key patch color.

It would be beneficial if any suppression technique or any processing of the foreground image prior to cutting out the foreground object took into account how closely the boundary images corresponded to the key patch while falling outside of the key patch color region.

SUMMARY OF THE INVENTION

The present invention improves upon chroma-key suppression techniques by generating suppression signals in accordance with pixel positions relative to a key patch region.

In one embodiment of the present invention, a chroma-key extractor examines the components of a first image. The components can be constituted by pixels. Each of the components or pixels is processed to determine the relative position of the color of that component with respect to a chroma-key patch. Some pixels will be detected to correspond to the key patch area. Others will be discovered to differ substantially from the key patch region. Finally, still others will be found to fall within a transition region adjacent to the key patch region. In accordance with the method of the present invention, suppression signals are determined in accordance with a position of a pixel color in the transition region. For example, if the pixel color falls within a first area of the transition region, the hue of the suppression signal to be applied to the pixel will be selected and then a saturation value will be determined. Similarly, if the pixel is determined to fall within a second area of the transition region, then a saturation component of the suppression signal is selected and a hue for that suppression signal is selected based on the position of the color of the pixel within that second area.

The method of the present invention improves the suppression of the halo-like effect by specifically addressing the phenomenon that arises in the boundary region of the foreground object and the background of the foreground image. More particularly, the present invention provides a more uniform color metric of the image processing operation.

DETAILED DESCRIPTION

In accordance with an embodiment of the present invention, an image processing system considers a transition region adjacent to a chroma-key patch, between the chroma-key patch and that portion of the color spectrum which is to be passed through a cut-out operation as described above. The image processing system then designates processing of image pixels which fall within this transition region. By paying attention to this transition region and processing the image signal in accordance with pixels' relative position with respect to such transition region, the present invention enhances the suppression of a halo-like effect when a foreground object to be applied to a composite image is cut out of a foreground image.

Figure 3:
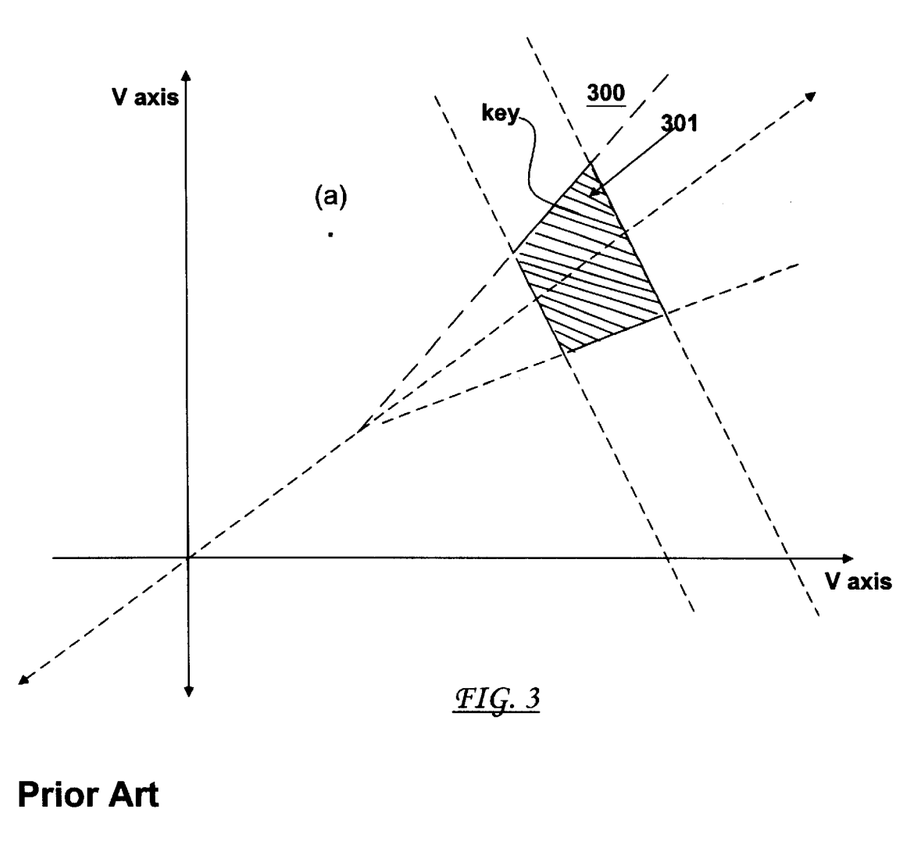
FIG. 3 illustrates an example of a chroma-key patch of the prior art.

In particular, FIG. 3 shows a known representation of a chroma-key patch in the u, v coordinate space. The key patch 300 corresponds to a color defined by the hue and saturation associated with the region 301 which would typically correspond to the background 103 of image 101. As a consequence in prior art systems, where a pixel is found to have a color that corresponds to the key patch region 301, that pixel is designated for being cut-out or removed from the foreground image. Furthermore, in the prior art any pixel which has a color which falls outside of the key patch, such as for example at point (a), would be treated as a pixel which would be passed through the discriminator and on to the composite image processor.

Figure 4:
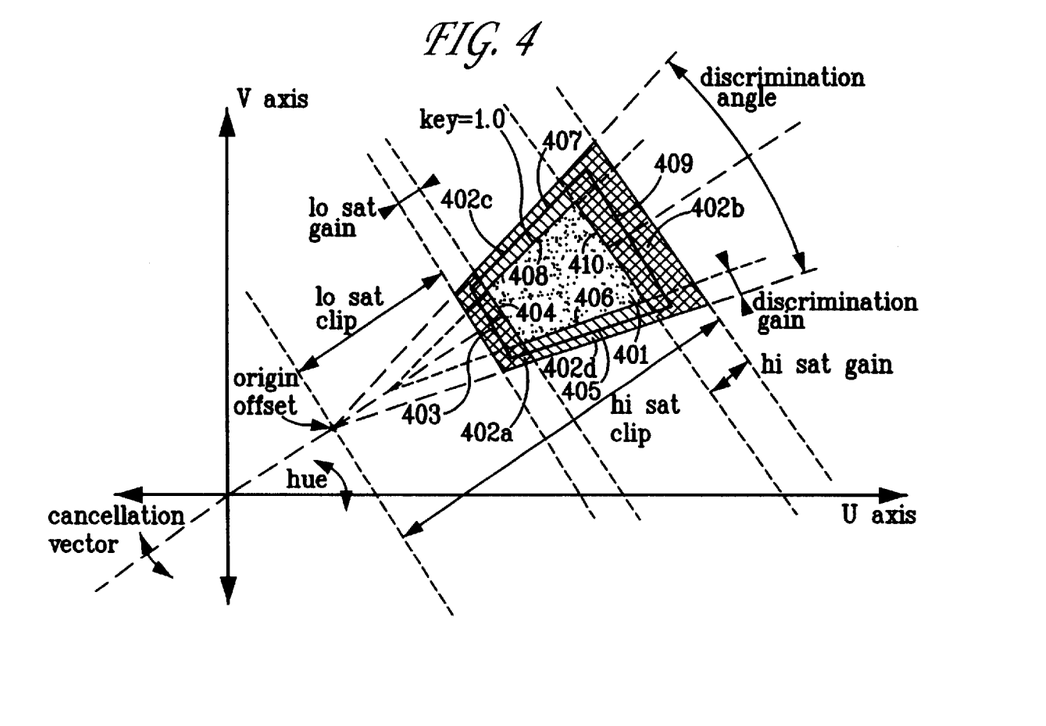
FIG. 4 illustrates an u, v plot showing a chroma-key patch and transition regions surrounding the chroma-key patch in accordance with an embodiment of the present invention.
Figure 5:
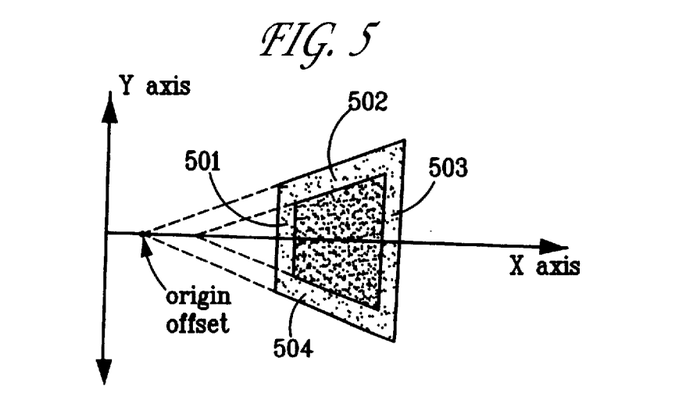
FIG. 5 illustrates an offset representation of a chroma-key patch of FIG. 4 in an x, y axis coordinate plot.

FIGS. 4 and 5 illustrate a designation of a new processing region as defined in accordance with an embodiment of the present invention. The new processing region includes key patch region 401 which generally corresponds to the key patch 301 of FIG. 3. However, the new region further includes transition region 402a–402d which substantially surrounds the key patch region. 402A represents a low saturation transition region. Region 402B represents a high saturation transition region and regions 402C and 402D are referred to as hue discrimination regions. It should be noted that in one embodiment of the present invention, region 402B is not included since the key patch is made to extend to the farthest points of the saturation curve so that in that circumstance the key patch is only bounded by the transition region on three sides, similar to 402A, 402C and 402D.

In accordance with the present invention, the components of the transition region are recognized as areas in which some processing of the foreground image ought to be done to avoid the halo effect which arises in the prior art. As can be seen, in an inspection of the transition region surrounding the key patch in FIG. 4, each component of the transition region is bisected by a line which runs parallel to the corresponding side of the trapezoid which forms the key patch region. For instance, mid-line 403 runs parallel to side 404. Mid-line 405 runs parallel to side 406. Mid-line 407 runs parallel to side 408 and mid-line 409 runs parallel to side 410.

In accordance with an embodiment of the present invention, the pixels of the foreground image are analyzed to determine where they are located relative to the chroma-key patch and the components of the transition region shown in FIG. 4. The processing of the pixel is designated so as to allow the pixel to pass through the discriminator if it is determined that the pixel is defined by a color outside of the chroma patch region and the transition region. The foreground pixel is discriminated or cut-out if it has a color that corresponds to the chroma-key patch. Finally, a special cancellation vector is selected for processing a given pixel where that pixel falls within one of the components of the transition region.

For instance, the pixel found to be in transition region 402A would be assigned a cancellation vector which is in part determined by the mid-line of transition region 402A, that is 403, and the position of the pixel along that mid-line. For instance, if the color falls within region 402A then suppression signals would be selected in accordance with the hue associated with the mid-line 403, where the hue is defined by the angle of said midline with respect to the x-axis, as well as the saturation associated with a point within transition region 402A that corresponds to the relative position of the pixel's color within that transition region. If the pixel is determined to fall within the component of the transition region 402B, then the mid-line is indicative of a saturation which is associated with a suppression signal to be applied to that pixel and the hue to be associated with that signal is subsequently determined by noting the position of the color pixel within that component of the transition region 402B. Thus, the present invention first determines the pixel's relationship to the chroma-key patch and the transition regions and then selects appropriate processing for the pixel based on that relative position information.

The present invention operates more easily by first rotating a representation of the chroma-key patch and transition regions, translating it onto an x, y axes coordinate space where the key patch and transition regions are disposed in a manner so as to be symmetric with respect to the x axis as shown in FIG. 5. This makes the processing somewhat simpler. For instance, all that is of concern is whether the pixel's color falls within the transition region components 501, 502 or 503 and whether the y axis value associated with the pixel color is positive or negative. These two pieces of information will define which of the components of the transition region the pixel corresponds to and then appropriate processing signals can be selected.

Figure 6:
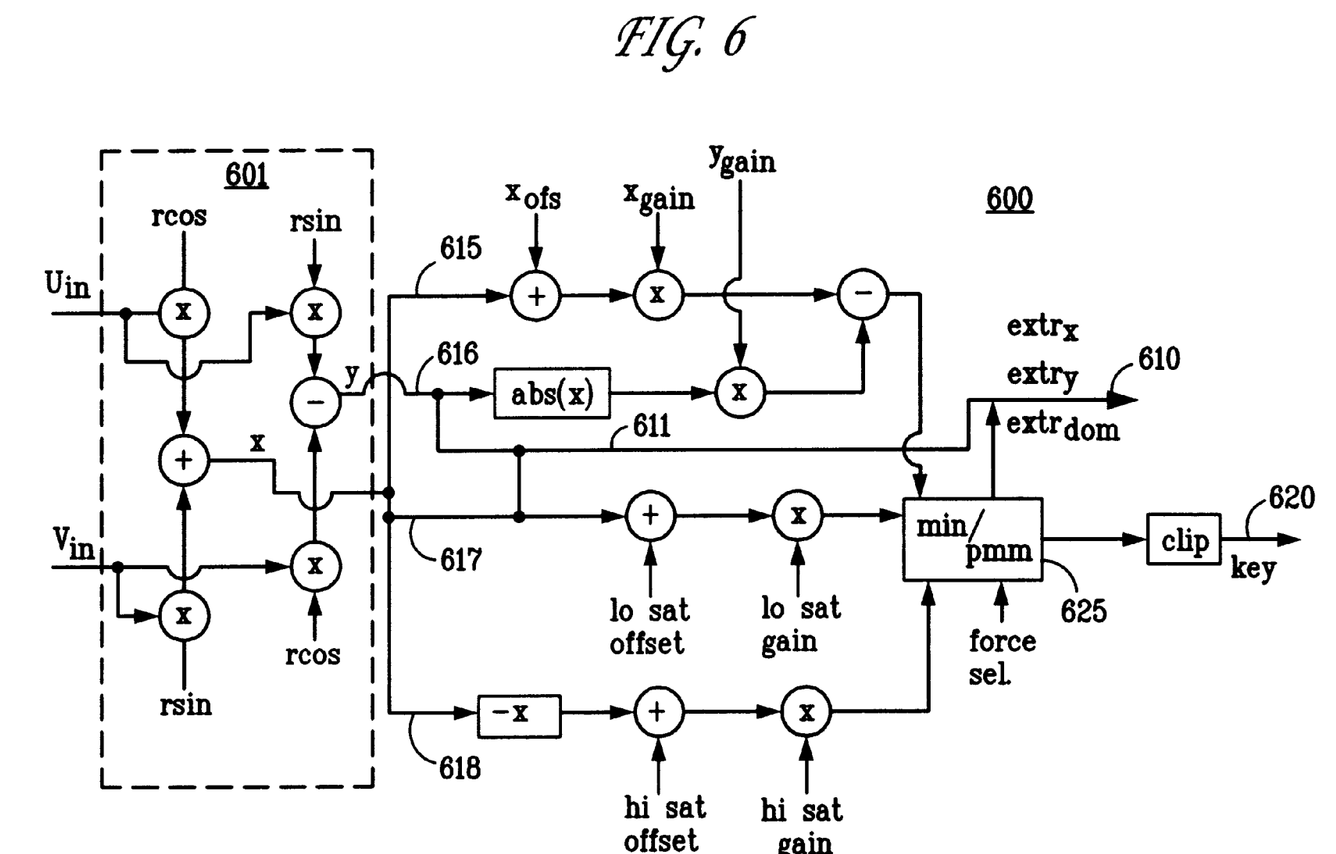
FIG. 6 illustrates a block diagram representation of a chroma-key extractor in accordance with an embodiment of the present invention.

A chroma-key extractor in accordance with an embodiment of the present invention is shown in FIG. 6. This chroma-key extractor determines a plurality of pieces of information which are used by a suppression circuit shown in FIG. 7 for suppressing the halo effect when cutting the foreground object out of the foreground image. In FIG. 6 the pixels of the foreground image are provided to the $U_{in}$ and the $V_{in}$ inputs of the extractor 600. In a first section of the extractor, 601, the pixel u, v values are converted into x, y axis coordinate space taking into the account the rotation of the chroma-key patch to the x axis as shown in FIG. 5. $U_{in}$ is multiplied by rcos and added to the product of $V_{in}$ times rsin. This provides the x-axis coordinate. Furthermore, the product of $V_{in}$ rcos is subtracted from the product of $U_{in}$ rsin to provide the y-axis coordinate. The translation portion thus outputs x and y values to be processed by the remainder of the extractor. The remainder of the extractor will determine the location of the pixel in the x, y coordinate space as well as determine a key signal to be associated with the pixels.

Specifically, there are two outputs 610 and 620. Output 610 provides information with respect to the extracted x, y coordinates of the pixel (extr x, extr y) as well as an indication of whether the pixel is in the space defined by the positive y coordinates or the negative y coordinates (extr dom). The second output, 620 provides a key signal.

Looking at the arrangement in more detail, line 611 carries the x and y signals extracted from portion 601. The x signals are supplied to a number of processing lines. For instance, the x value is subjected to addition with an x offset (x ofs) and that sum is multiplied by an "x gain" in arm 615 of the processing circuitry. Meanwhile, the y value of the pixel is subjected to an absolute value operation (abs (x)) and multiplied by a pre-set y gain in arm 616 of the processor. The results of these two lines of processing are passed to a subtractor whose output is then supplied to a minimum detector and to a "poor man's multiply" (pmm). The minimum detector can be the inverse of a Non-Additive Mix (NAM) block, whereby the detector finds and passes the minimum of two or more inputs. The pmm corresponds to a function PMM=x+y−1 with a floor of 0 (i.e., no negative numbers). This function approximates, fairly well, the actual multiply for output values of 0.5 to 1. Furthermore, the extracted x value is added to a low saturation offset (lo sat offset) and that sum is multiplied by a low saturation gain (lo sat gain) in processing line 617 before it is subjected to the pmm 625. Finally, the x value is subtracted from a high saturation offset (hi sat offset) and multiplied times a high saturation gain (hi sat gain) in processing line 618 whose output is also supplied to the pmm 625. The pmm determines the minimum of all three of these processing branch lines and clips that minimum value to produce the final key value along output 620. The pmm 625 also determines the location of the pixel with respect to the positive or negative y coordinates space and supplies that information to be treated as the extracted information "extr dom" to be supplied along with extr x and extr y at output 610.

Thus, the chroma-key extractor of the embodiment of FIG. 6a) determines a key signal indicating those pixels which correspond to a chroma-key patch; and b) properly identifies a position of the pixels which fall outside of the chroma-key patch. This latter information can define whether the pixel falls within a transition region adjacent to the chroma-key patch. If it falls within this transition region the position information can then be utilized by a suppression circuit, as will be described below to generate a more optimal suppression signal.

Figure 7:
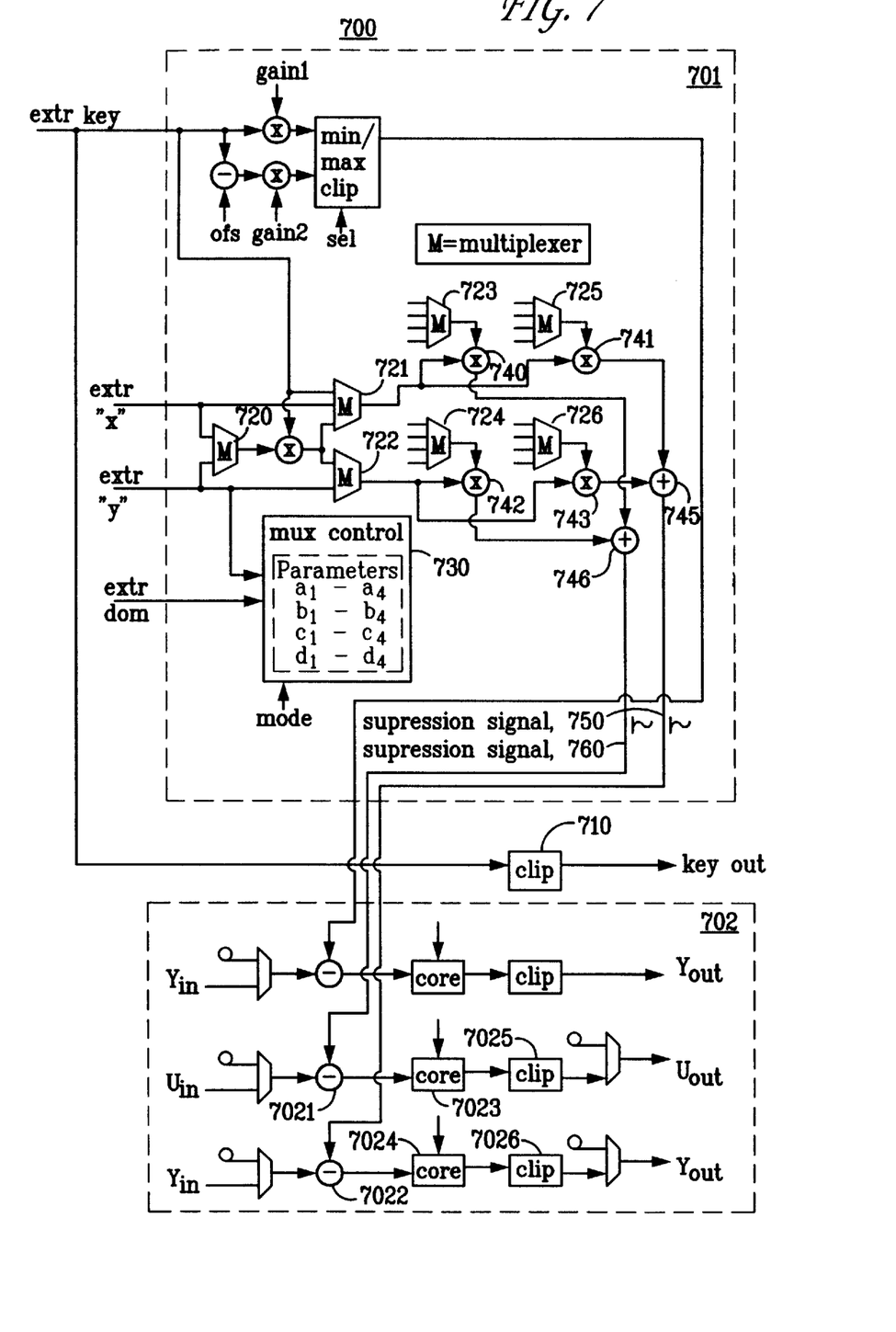
FIG. 7 illustrates a block diagram of a suppressor circuit in accordance with an embodiment of the present invention.

An example of a suppression circuit in accordance with an embodiment of the present invention is shown in FIG. 7. The suppression circuit 700 can be divided into a number of components. A first component 701 takes the information received from the chroma-key extractor such as that shown in FIG. 6, and generates suppression signals utilizing previously stored parameters. The suppression signals can then be supplied to processing circuitry 702 which operates upon the image pixels in accordance with the generated suppression signals.

Suppression signal generator 701 receives as inputs the key signal as well as the extr x, the extr y, and the extr dom from the chroma-key extractor. A plurality of multiplexers 720 to 726 are under the control of multiplexer controller 730. Based on the selection of the multiplexer controller 730 the extracted x and y signals which define which component of the transition region, if any, an image pixel resides in will select among a plurality of parameters a1 to a4, b1 to b4, c1 to c4, and d1 to d4 for processing the extracted x, y signals as well as the extracted key to produce the appropriate suppression signals. Specifically, the multiplexers will select their inputs based on whether the x, y coordinate information for a pixel identifies that the image pixel corresponds to, for instance, region 502, 503 or 504 as shown in FIG. 5 where region 503 corresponds to the high saturation zone, region 501 corresponds to the low saturation zone, region 502 corresponds to the positive angle zone and region 504 corresponds to the negative angle zone. Thus, the location of the image pixel within one of the components of the transition region will force the multiplexers to make the appropriate selection of the inputs to be supplied to multipliers 740 to 743. The output of these multipliers are then supplied to adders 745 and 746 to produce the suppression signals 750 and 760 that are supplied into the processing circuitry 702. Table 1 which follows sets forth a possible arrangement of the selection of multiplexer inputs based upon where the pixel is located with respect to the designated transition regions. When this particular example is applied to the multiplexer as shown above, specific ones of the parameters a1 to d4 are selected for the multiplication operations. This will yield the appropriate suppression or cancellation vector processing information from adders 745 and 746. The U and V inputs are then subjected to processing using these suppression signals and the subtractors 7021 and 7022. The output of the subtractors are submitted to core elements 7023 and 7024 and passed on to clippers 7025 and 7026 before they are released as outputs.

TABLE 1

| Zone | Mux 720 | Mux 721 | Mux 722 | Mux 723 | Mux 724 | Mux 725 | Mux 726 |
|---|---|---|---|---|---|---|---|
| Hi saturation | extr y | extr x | k extr y | $a_4$ | $b_4$ | $c_4$ | $d_4$ |
| Lo saturation | extr y | extr x | k extr y | $a_3$ | $b_3$ | $c_3$ | $d_3$ |
| Positive Angle | extr x | k extr x | extr y | $a_1$ | $b_1$ | $c_1$ | $d_1$ |
| Negative Angle | extr x | k extr x | extr y | $a_2$ | $b_2$ | $c_2$ | $d_2$ |

N.B. for fixed vector scenario use the Positive Angle parameters

The received extracted key signal is processed by key processor portion 710 so as to provide a processing or suppression signal which will effect the luminance signal $Y_{in}$, in processor 702. This processor is used to selectively darken the "halo" region and to further force the luminance value to black in the hard key (center of the key patch) region.

The present invention provides another advance in the way in which pixels are processed, particularly with respect to pixels determined to reside in either the low or high saturation transition regions. In these regions the color cancellation vector is selected as a constant "X" value and a calculated color angle. The constant X value is selected as the midpoint along the x-axis extending from a lower boundary to an upper boundary of the particular saturation transition region. The color angle is calculated based on the "Y" value. Rather than determining the slope of the actual color vector "Y/X", the slope is approximated using a multiplication constant K determined in relationship to the X midpoint. $K=1/X_{mid}$. K is set once per field time. By so determining the multiplication factor the present invention avoids excessive per-pixel divide operations which are costly both in terms of being a drain on processing power or requiring excessive gate count in hardware.

As a consequence of the processing described above with respect to FIG. 7, the suppression circuit supplies a key signal as an output as well as modified U, V and Y signals which can then be subjected to the key operation which will cut out the foreground object from the foreground image to be supplied to the adder that will produce the composite image. Thus, the present invention improves upon the prior art which used suppression circuitry along with the key signal by improving the generation of the suppression signals taking into account a transition region adjacent to a chroma-key patch otherwise used for generating a key signal. To achieve this the block diagram representation of FIG. 2B would be modified to show that the suppression signal parameters ø and r are varied in accordance with the transition region portion in which a given pixel resides.

Thus, in accordance with the present invention pixels of a foreground image can be analyzed to determine their relative position with respect to a chroma-key patch and adjacent transition regions. Once the relative position is detected, suppression signals for adapting the image pixels to reduce the halo effect can be selected. More particularly, specific saturation and hue components of color vectors used to process the foreground image can be selected depending on which if any of the transition regions adjacent to the chroma-key patch the image pixels correspond. This arrangement improves the overall presentation of the foreground object discriminated from the foreground image and it's background before that object is present to a processor for producing a composite image.

What is claimed is:

1. A method for creating a composite image from a first image and a second image, the method comprising the steps of:
processing the first image to delineate a foreground object, said step of processing including the sub-steps of,
  extracting a key signal from the first image with reference to a chroma key patch,
  extracting information identifying a relative position of a component of said first image with respect to the chroma key patch,
  determining a suppression signal to be applied to said component using the extracted key signal and the extracted relative position information, and
  operating on the first image with the suppression signal to separate the foreground object from a remainder of said first image;
combining said delineated foreground object and the second image.

2. The method of claim 1 wherein said step of determining a suppression signal comprises the sub-steps of:
  identifying whether the component's position with respect to said chroma key patch corresponds to one of a plurality of transition regions adjacent to said chroma key patch;
  if said component corresponds to one of said plurality of transition regions, identifying the corresponding transition region; and
  selecting suppression signal parameters in accordance with the identified transition region.

3. The method of claim 2 wherein said component of said first image comprises a pixel.

4. The method of claim 1 wherein said component of said first image comprises a pixel.

5. A method for approximating a color in a transition boundary adjacent to a chroma key patch, the method comprising the steps of:
  detecting that a component of an image corresponds to one of a plurality of regions that are included in the transition boundary;
  when it is detected that said component corresponds to a first region of said plurality of regions;
    selecting a first hue, and
    adjusting a saturation associated with said first hue in accordance with a position of said component in said first region;
  when it is detected that said component corresponds to a second region of said plurality of regions,
    selecting a first saturation, and
    determining, in accordance with a position of said component in said second region, a hue to be associated with said first saturation; and
  when it is detected that said component corresponds to a third region of said plurality of regions,
    selecting a second hue, and
    adjusting a saturation associated with said second hue in accordance with a position of said component in said third region.

6. The method of claim 5 wherein said transition boundary includes a fourth region and wherein when it is detected that said component corresponds to said fourth region, selecting a second saturation and determining, in accordance with a position of said component in said fourth region, a hue to be associated with said second saturation.

7. The method of claim 5 wherein said component comprises a pixel in a first electronic representation of said image.

8. A method for adjusting a chroma key suppression signal for a component of an image, the method comprising the steps of:
   selecting a saturation for the suppression signal in accordance with a relationship between the component and a key patch that is identified by a chroma key operation that identifies a transition region associated with the key patch; and
   determining a hue of the suppression signal in accordance with a position of the component in said transition region.

9. The method of claim 8 wherein said key patch is defined by a plurality of u, v color coordinates and said transition region substantially surrounds said key patch.

10. The method of claim 9 wherein said transition region comprises a plurality of portions wherein if said component corresponds to a first portion of the transition region said step of selecting a saturation chooses a first saturation and said step of determining a hue comprises the step of selecting a hue value in accordance with a position of the component within said first portion of said transition region.

11. A method for adjusting a chroma key suppression signal for a component of an image, the method comprising the steps of:
   selecting a hue for the suppression signal in accordance with a relationship between the component and a key patch that is identified by a chroma key operation that identifies a transition region associated with the key patch and determining a saturation of the suppression signal in accordance with the a position of the component in said transition region.

12. The method of claim 11 wherein said key patch is defined by a plurality of u, v color coordinates and said transition region substantially surrounds said key patch.

13. A method for selecting a saturation for a chroma key suppression signal associated with a component of an image, the method comprising the steps of:
   extracting a key signal from the image;
   extracting a position of the component with respect to a chroma key patch associated with said key signal;
   determining the saturation of the chroma key suppression signal based on said extracted position and said extracted key signal.

14. The method of claim 13 wherein said chroma key patch is defined by a plurality of u, v color component values.

15. The method of claim 14 wherein said step of extracting a position includes the sub-step of detecting whether said component falls within a transition region associated with said chroma key patch.

16. The method of claim 15 further comprising the step of selecting a hue for said chroma key suppression signal based on the position of the component within said transition region and wherein said step of determining saturation comprises the sub-step of scaling a saturation vector associated with the selected hue in accordance with the position of the component within said transition region.

17. A method for suppressing colors in an image that are in proximity to a chroma key patch, the method comprising the steps of:
   extracting a key signal from the image with reference to the chroma key patch;
   extracting information identifying a relative position of a component of the image with respect to the chroma key patch;
   determining a suppression signal to be applied to a given component using the extracted key signal and the extracted relative position information; and
   operating on the given component with the suppression signal determined for said given component.

18. The method of claim 17 wherein said step of extracting information comprises the sub-steps of identifying a location of said component in the UV color space and detecting whether said location falls within a transition region adjacent said chroma key patch.

19. The method of claim 18 wherein said transition region comprises a plurality of regions and said step of determining a suppression signal selects certain parameters for said suppression signal when said location falls within one of said plurality of regions.

20. The method of claim 17 wherein said component is a pixel.

21. A method for determining suppression signals in a chroma key suppressor, the method comprising the steps of:
   receiving information relating to an image component, the information identifying which one of a plurality of transition regions, associated with a chroma key patch, corresponds to the image component;
   when a first transition region is identified, retrieving a saturation signal and determining a hue to be associated with said saturation signal based on a position of the image component in the first transition region; and
   when a second transition region is identified, retrieving a hue signal and adjusting a saturation associated with said hue signal based on a position of the image component in the second transition region.

22. A method for suppressing colors in an image that are in proximity to a chroma key patch, the method comprising the steps of:
   extracting a key signal from the image with reference to the chroma key patch;
   extracting information identifying a relative position of a component of the image with respect to the chroma key patch;
   determining a suppression signal to be applied to a given component using the extracted key signal and the extracted relative position information wherein said step of determining includes the sub-steps of;
   receiving relative position information which identifies which one of a plurality of transition regions, associated with the chroma key patch, corresponds to the image component;
   when a first transition region is identified, retrieving a saturation signal and determining a hue to be associated with said saturation signal based on a portion of the component in the first transition region; and
   when a second transition region is identified, retrieving a hue signal and adjusting a saturation associated with said hue signal based on a position of the component in the second transition region; and
   operating on the given component with the suppression signal determined for said given component.

* * * * *